Figure 1:
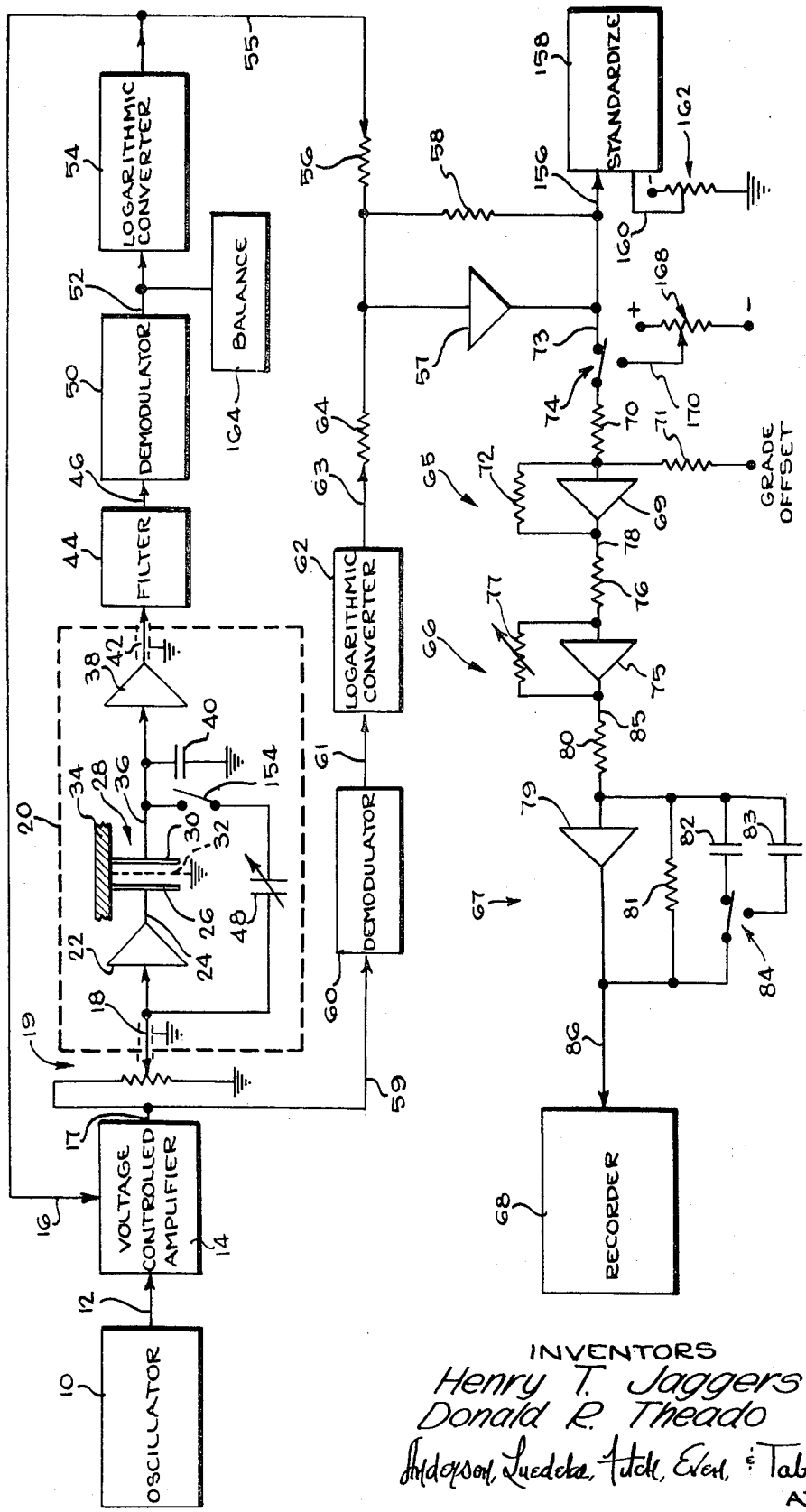

United States Patent
Jaggers et al.

[15] 3,684,954
[45] Aug. 15, 1972

[54] SINGLE FREQUENCY MOISTURE GAUGE WITH LOGARITHMIC FEEDBACK

[72] Inventors: Henry T. Jaggers, Worthington; Donald R. Theado, Grove City, both of Ohio

[73] Assignee: Industrial Nucleonics Corporation

[22] Filed: Dec. 21, 1970

[21] Appl. No.: 100,035

[52] U.S. Cl. .................................................. 324/61
[51] Int. Cl. ............................................. G01r 27/26
[58] Field of Search ............................ 324/57, 60, 61

[56] References Cited

UNITED STATES PATENTS

| | | | |
|---|---|---|---|
| 3,217,247 | 11/1965 | Taber | 324/57 |
| 3,443,219 | 5/1969 | Adams | 324/61 |
| 2,535,027 | 12/1950 | Anderson | 34/52 |
| 2,768,629 | 10/1956 | Maul | 131/135 |
| 2,769,338 | 11/1956 | Hermanson | 73/304 |
| 2,950,436 | 8/1960 | Butticaz et al. | 324/61 |
| 3,155,902 | 11/1964 | Walls | 324/61 |
| 3,241,062 | 3/1966 | Baird | 324/61 |
| 3,255,411 | 6/1966 | Norwich | 324/61 |
| 3,320,946 | 5/1967 | Dethloff et al. | 128/2.1 |
| 3,387,776 | 6/1968 | Stillwell et al. | 324/61 |
| 3,408,566 | 10/1968 | Norwich | 324/61 |
| 3,458,803 | 6/1969 | Maguire | 324/60 |

*Primary Examiner*—Stanley T. Krawczewicz
*Attorney*—Anderson, Luedeka, Fitch, Even & Tabin, William T. Fryer, III and C. Henry Peterson

[57] ABSTRACT

For quantitively determining a property of a dielectric material, in particular its relative moisture content, an alternating current electrical signal at a constant frequency is applied to a capacitive probe coupled to the material. The effect of the capacitance of the empty probe is balanced out, and a detection signal is produced from the imbalance occasioned by the dielectric material. A first logarithmic signal is derived logarithmically related to the detection signal and used to vary the applied signal in a direction opposite to changes in the detection signal to reduce the demands upon the dynamic range of system components. A second logarithmic signal is derived logarithmically related to the applied signal. The first and second logarithmic signals are then combined to produce a third logarithmic signal logarithmically related to the ratio of said detection and applied signals, and indicative of the property of the material.

13 Claims, 2 Drawing Figures

INVENTORS
Henry T. Jaggers
Donald R. Theado
Anderson, Luedeka, Fitch, Even & Tabin
ATTYS.

SINGLE FREQUENCY MOISTURE GAUGE WITH LOGARITHMIC FEEDBACK

This invention is directed generally to the quantitative determination of a property of a dielectric material, and more particularly to the continuous measurement of moisture content in a continuous product by means of a capacitance probe energized at a single constant frequency. It is still more particularly directed to a single frequency moisture gauge wherein a signal corresponding to a logarithmic function of the detected signal is utilized to control the applied signal to reduce the range of the signals being processed, while the property being measured varies over a large range.

It has been previously known to measure the moisture content of a dielectric material by utilizing the material as the dielectric of a capacitance probe and measuring the effect of the moisture upon the dielectric constant of the material. In certain of the prior art it has been known to utilize a two-frequency moisture gauge in order to measure moisture independent of the variations in mass. While this prior art has been particularly satisfactory under the conditions for which it was designed, as for example, in measuring the moisture content of thin, relatively dry paper, it has proven difficult to measure accurately the moisture content of relatively heavy paper, such as kraft or liner board, where the moisture in the product is layered, the product being relatively dry on the outside, but having a moisture content up to 25 percent or so in its interior.

For measurement of the moisture of such heavy paper, it has been found suitable to utilize a moisture gauge at a single frequency, for although the measurement is not truly independent of mass, the relative effect of mass upon the moisture measurement is less for the heavy papers and can generally be ignored or allowed for. On the other hand, the moisture content of heavy papers can vary over such a wide range that it is difficult to provide components having a sufficient dynamic range to permit accurate measurement.

In accordance with the present invention, the dynamic range required for the critical components is reduced by providing feedback of a signal corresponding to a logarithmic function of the detection signal from the capacitance probe to control the signal applied to the probe, so that in the event of a large unbalance in the probe circuit, the larger output signal is used to reduce the input signal, whereby the dynamic range of none of the components is exceeded. Further, the logarithmic detection signal is then combined with a signal that is logarithmically related to the controlled applied signal to produce a logarithmic measurement signal quantitatively indicative of the moisture content of the material. This logarithmic measurement signal is substantially a linear function of moisture content and provides an additional advantage in that the measurement signal is independent of the absolute value of the probe drive signal.

Accordingly, it is the primary objective of the present invention to provide a new and improved method and system for quantitatively determining the property of a dielectric material. A further object is to provide an improved single frequency measurement method and system for determining the moisture content of material in which the moisture content varies widely. It is still another object of the invention to provide such method and system whereby logarithmic feedback is utilized to reduce the dynamic range required for the components of the system.

Figure 2:
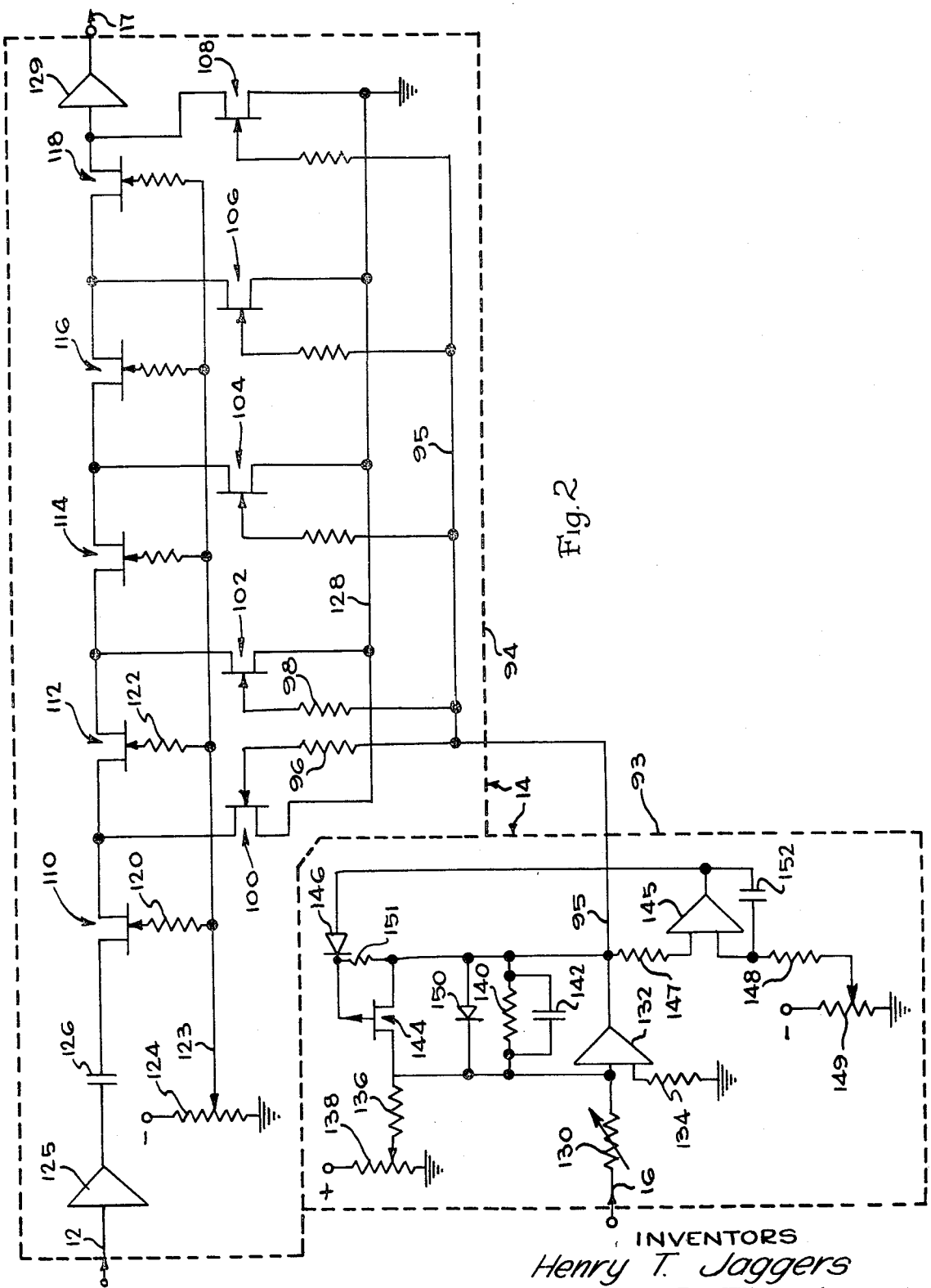

Further objects and features of the present invention will become apparent from the following detailed description, particularly when taken in conjunction with the following drawings, in which:

FIG. 1 is a diagrammatic illustration of a general form of the measuring system of the present invention; and FIG. 2 is a diagrammatic illustration of a preferred form of the voltage controlled amplifier used in the system illustrated in FIG. 1.

In FIG. 1 there is illustrated a simplified form of a system utilizing the present invention. As shown in FIG. 1, an oscillator 10 provides an alternating current electrical signal. The frequency of the signal is chosen according to the particular measurement to be made. Frequencies from 10 kilohertz to 1 megahertz have been found useful. The higher frequencies are useful for measurements of relatively high moisture content. An electrical signal from the oscillator 10 is applied over a lead 12 to a voltage controlled amplifier 14. The voltage controlled amplifier 14 produces a signal at the frequency of the oscillator 10 and of a magnitude dependent upon the magnitude of a control signal applied over a lead 16 to the control terminal of the voltage controlled amplifier 14. The output of the voltage controlled amplifier 14 is applied over a lead 17 to a lead 18 through a standardizing potentiometer 19 which applies a portion of the signal on lead 17 to lead 18. This portion of the signal is applied over the lead 18 to the probe electronics contained at a probe head 20 which may be some distance remote from the rest of the circuit. The lead 18 may, therefore, be a relatively long line. The oscillator 10 and the voltage controlled amplifier 14 may be considered collectively as a source of the applied alternating current electrical signal as applied to the probe head 20.

In the probe head 20, the applied signal is applied through an excitation amplifier 22, which inverts the applied signal and applies the inverted signal over a lead 24 to one plate or electrode 26 of a capacitance probe 28, which has a second plate or electrode 30. As shown, the capacitance probe 28 may be a fringe field capacitor with an intermediate grounded electrode 32 between its plates 26 and 30. The material to be measured, such as a sheet 34, is disposed in contact with the probe 28 in the fringe field of the capacitance of the probe 28. The sheet 34 to be measured is formed of a dielectric material which, therefore, determines the admittance of the probe 28. More particularly, an increase in relative moisture increases the admittance of the probe. Thus, the signal as applied at the plate 26 is influenced by the material, and produces an output signal on the lead 36 connected to the plate 30. This output signal is applied to a detector amplifier 38. A probe load capacitor 40 is connected between the lead 36 and ground to develop the output signal. The detector amplifier 38 operates to drive a lead 42, which like the lead 18, may be a relatively long line connecting the probe head 20 to the rest of the circuit.

As shown, the signal on the lead 42 is passed through a filter 44 tuned to the frequency of the oscillator 10. This reduces or eliminates process or system noise or harmonics that may have been produced, and produces on a lead 46 an alternating current detection signal, the magnitude of which is dependent upon the dielectric constant of the sheet 34 and, therefore, on its moisture content. This detection signal would be in large measure determined by the capacitance of the probe itself, were it not for a balancing signal as provided by a balancing capacitor 48 coupled between the lead 18 and the lead 36.

The signal as applied through the balancing capacitor 48 is opposite in phase to the signal applied to the probe electrode 26 on the lead 24. Its magnitude is determined by the capacitance of the balancing capacitor 48, which is adjusted so that in the absence of material 34 at the probe 28, the signal at the lead 46 is substantially zero. This balances out the effect of the empty probe on the detection signal, that is, the effect of probe capacitance in the absence of material 34. The detection signal then becomes a measure of the imbalance of the probe as occasioned by the component of admittance produced by the relative moisture content of the sheet 34. Actually, the balancing circuit may take a number of forms. For example, the capacitance of the capacitor 48 may be remotely controlled. It is also possible to use an inverting amplifier in the balancing circuit rather than using the excitation amplifier 22 in the direct circuit to the probe to produce the signal or opposite phase.

The lead 46 applies the alternating current detection signal to a demodulator 50, which demodulates the alternating current signal to produce a direct current detection signal on an output lead 52. This direct current detection signal on the output lead 52 provides an indication of the moisture content of the sheet 34.

For the materials for which the system is most useful, the range of moisture content occasions a change in output signal over a range of about 400 to 1 for a given applied signal on the lead 18. This places great demand on the dynamic range required for the demodulator 50 and the detector amplifier 38, if accurate quantitative measurements are to be made. To reduce this demand, a control signal is applied to the control terminal of the voltage controlled amplifier 14 to reduce the applied signal on the lead 18, as the detection signal on the lead 52 increases. This control signal is developed on the lead 16 by a first logarithmic converter 54 to which the detection signal is applied over the lead 52.

The logarithmic converter 54 may be any of a number of well-known circuits for converting a direct current input signal into a logarithmic direct current output signal logarithmically related to the input signal. See, for example, the Fairchild Semiconductor Linear Integrated Circuits Applications Handbook, written and edited by James N. Giles, pages 150–152(1967). The logarithmic converter 54 produces a first logarithmic signal logarithmically related to the detection signal. This logarithmic signal is used as a control signal to produce on the lead 18 an applied signal that changes in about the same proportion as the detection signal but in the opposite direction. It is a second function of the logarithmic converter 54 to produce a logarithmic signal related to moisture content in a systematic manner particularly suitable for processing into an appropriate measurement signal, as the detection signal is an exponential function of moisture content. The logarithmic signal from the logarithmic converter 54 is applied by a lead 55 through an input resistor 56 to the input terminal of a summing amplifier 57 having a feedback resistor 58 connected between its input and output terminals.

At the same time, the applied signal on the lead 17 is also applied over a lead 59 to a demodulator 60, which may be substantially identical to the demodulator 50 and operates in the same fashion to convert an alternating applied signal to a corresponding direct current signal which is a measure of the applied signal. As the detection signal on the lead 52 is itself indicative of moisture content only for a predetermined applied signal, when the applied signal is varied in the manner described, it is the ratio of the detection signal to the applied signal that is indicative of the moisture. More exactly, the ratio of these signals is an exponential function of the moisture content. Therefore, the direct current signal from the demodulator 60 is applied over a lead 61 to a second logarithmic converter 62 which may be similar to the first logarithmic converter 54. The second logarithmic converter 62 converts the direct current signal into a second logarithmic direct current signal logarithmically related to the applied signal. The second logarithmic signal is applied by a lead 63 through an input resistor 64 to the input terminal of the summing amplifier 57. The summing amplifier 57 acts to additively combine the first and second logarithmic signals to produce a third logarithmic signal. Actually, the second logarithmic signal is of the sense opposite to the first signal so that effectively the third logarithmic signal is related to the difference between the first and second logarithmic signals and hence logarithmically related to the ratio of the detection signal and the applied signal and hence substantially linearly related to the relative moisture content of the sheet 34. The third logarithmic signal is applied through a grade offset section 65, a slope control section 66 and a filter section 67 to a recorder 68 or to a meter or a control circuit, as desired.

The function of the grade offset section is to add in a compensating signal to offset the effect of mass upon the recorded signal. It was mentioned above that the single frequency moisture gauge was not independent of mass, but that for heavy paper, the effect of mass could generally be disregarded, as the mass did not ordinarily vary greatly for a given run on a paper-making machine, particularly where the mass per unit area or basis weight is controlled. On the other hand, when the machine is used to made a different grade of paper, the recorder 68 would fall out of calibration were it not for the grade offset section 65. The grade offset section 65 comprises a summing amplifier 69 having input resistors 70 and 71 connected to its input and a feedback resistor 72. The third logarithmic signal is applied over a lead 73 through a single pole, double-throw switch 74 to the input resistor 70. A grade offset signal representing a particular mass per unit area of sheet 34 is applied to the other input resistor 71. The summing amplifier 69 then adds the two signals to provide a moisture indicative signal with the mass component subtracted out. If desired, the grade offset signal can be derived from an actual measurement.

The slope control section 66 also provides for changes in recorder calibration occasioned by changes in grade of paper being made. The slope control section 66 compromises an amplifier 75 having an input resistor 76 connected to its input terminal and variable feedback resistor 77 connected between its output and input terminals. The output signal from the grade offset section 65 is applied over a lead 78 through the input resistor 76 to the amplifier 75. Because of the variable feedback, the amplifier 75 is essentially a gain control, with its gain determined by the resistance of the variable resistor 77. This resistor may in fact comprise a resistance box, permitting the switching in of selected fixed resistors corresponding to particular grades of paper.

The filter section 67 determines the time constant for the system. It comprises an amplifier 79 having an input resistor 80 connected to its input terminal and a feedback resistor 81 connected between its input terminal and its output terminal. Capacitors 82 and 83 are alternatively connected in shunt with the feedback resistor 81 by a single pole, double-throw switch 84. The output signal from the slope control section 66 is applied over a lead 85 through the input resistor 80 to the amplifier 79. Because of the capacitance in the feedback circuit, the filter section integrates and delays the input signal according to the time constant of the feedback circuit which depends upon which capacitor is in the circuit. Typically the time constant of the system may be switchable from 5 milliseconds to 5 seconds, depending upon the particular paper-making operation.

The output of the filter section 67 is applied over a lead 86 to the input terminal of the recorder 68 which may comprise a conventional recorder. As mentioned, the signal thus applied to the recorder is substantially a linear function of the moisture content of the material 34 being measured. To the extent that the function is non-linear, it may be linearized in a conventional way. A two-segment linearizer has been found useful for compensating for a slight non-linearity at low moisture levels.

It was mentioned above that the signal from the logarithmic converter 54 caused the voltage controlled amplifier 14 to produce on the lead 18 an applied signal changing in about the same ratio as the detection signal on the lead 52 changes to balance the dynamic range required for the demodulators 50 and 60. Thus, were the system to require a dynamic range of 400, the dynamic range of each of the demodulators could be made only 20, which may reasonably be achieved with considerable accuracy. Further, the use of the logarithmic signal for the control signal and changing the applied signal in the same proportion as the detection signal permits a combined signal more accurately indicative of moisture than has previously been achieved. This is at least in part occasioned by the logarithmic relationship between relative moisture content and the detection signal which makes the logarithmic signals linear functions of moisture.

The voltage controlled amplifier 14, as shown in FIGURE 2 is comprised of a control section 93 and an amplifier section 94. The amplifier section as illustrated has an input stage 125 and an output stage 129 connected by a temperature-compensated FET voltage control network.

The control is based upon the use of FETs as controllable resistors. The control signal on the lead 16 is processed by the control section 93, and the processed signal is applied on a lead 95 through a plurality of isolating gate resistors as at 96 and 98 to the gates of a plurality of respective FETs 100, 102, 104, 106 and 108. A second plurality of FETs 110, 112, 114, 116 and 118 are used to compensate for the effects of temperature on the voltage control FETs 100–108. The gates of the temperature-compensating FETs 110–118 are connected via gate resistors as at 120 and 122 to a common lead 123 and thence to the variable tap of a potentiometer 124. This potentiometer is energized by a constant-voltage d.c. source of potential which is negative with respect to ground.

The input signal from oscillator 10 is applied over lead 12 to an amplifier 125 whose output is fed via capacitor 126 to the drain of the first temperature-compensating FET 110. The source electrode of FET 110 is connected to the drains of both the first voltage-control FET 100 and the second temperature-compensating FET 112. In a similar manner the source electrode of FET 112 is connected to the drains of both the second voltage-control FET 102 and the third temperature compensating FET 114. The duplication of this arrangement is continued to form, in all, five identical stages of FET voltage dividers.

The signal applied via amplifier 125 and capacitor 126 is coupled via the series string of five temperature-compensating FETs 110–118 to the input of an amplifier 129. The voltage-control FETs 100–108 provide variable-resistance shunt connections to a ground lead 128, with the resistance of these shunt connections being controlled by the magnitude of the control voltage on lead 95 which is applied to the gates of the FETs via gate resistors as at 96 and 98. The FETs 100–108 thus determine the amount of voltage drop which appears across the respective FETs 110–118 and hence determine the magnitude of the portion of the oscillator signal voltage which is applied to the input of amplifier 129. If fixed-value resistors were to be used in place of FETs 110–118, and if an increase in temperature caused the source-to-drain resistance of FETs 100–108 to decrease, the additional current shunted to ground and the additional voltage drop across the fixed-value resistors would decrease the amplitude of the a.c. signal fed to the input of the amplifier 129, thereby proportionately reducing the amplitude of the drive signal fed to the probe head 20 via lead 17 at the output of amplifier 129. However, the same temperature increase will proportionately decrease the resistance of FETs 110–118 and the attenuation of the signal produced thereby, so that there is substantially no net signal change with temperature changes.

The output signal from the last amplifier stage 129 appears on lead 17 and may be considered the signal to be applied to the capacitance probe 28. However, to provide a standardizing adjustment, the signal on lead 17 may be applied to the lead 18 through the standardizing potentiometer 19 which acts to apply a predetermined portion of the signal to the lead 18. As the two signals are related by the predetermined factor determined by the setting of the potentiometer 19, either of them may be considered to be the applied signal or the signal from the source.

The components of the control section 93 in association with the signal from the first logarithmic converter 54 produce the desired response whereby the applied signal on lead 18 varies appropriately in response to changes in the detection signal on lead 52.

As shown in FIGURE 2, the control section 93 may comprise an adjustable input resistor 130, to which the control signal is applied over the lead 16. The input resistor 130 is connected to the input circuit of an amplifier 132, the output of which is connected to the lead 95. The amplifier 132 is connected to ground through a resistor 134. A reference signal is applied to the input circuit of the amplifier 132 through an input resistor 136. This reference signal is obtained from a voltage divider 138 connected to a source of potential which is positive relative to ground in order to provide a desired positive reference signal. The amplifier 132 is connected as a summing amplifier by virtue of a feedback resistor 140 connected between its output and input terminals. A capacitor 142 is connected in shunt with the resistor 140 to establish a desired time constant for the response of the voltage controlled amplifier, thus assuring proper stability to the circuit.

With the circuit as thus far described, the setting of the variable resistor 130 most particularly determines the slope or gain of the voltage control characteristic of the amplifier 14. At the same time the reference signal applied through the second input resistor 136 provides an offset signal which most particularly determines the operating point for the control of the voltage controlled amplifier 14. In producing a commercial version of this circuit, the adjustments are performed arbitrarily. The oscillator 10 provides exactly a 1.0-volt rms signal on line 12. With a DC signal of +2.6 volts applied to the voltage control input line 16, the rms output on line 17 should be 1.4 volts. With a DC signal of 1.7 volts on line 16, the output on line 17 should be 86 millivolts rms. If there is too great or too small a difference between the two rms outputs with the specified inputs, in general an appropriate adjustment is made to variable resistor 130. If the two rms outputs are both too high or too low, in general an appropriate adjustment is made to voltage divider 138. Since there is an interdependence between the two adjustments, it may be necessary to repeat the voltage checks and adjustments several times, but, once properly set, it is not expected that any readjustment will be required on a gauge in service.

Under certain conditions of operation such as when material 34 is removed from the probe 28 for standardizing, a control signal may be developed which is outside of the control range. In order to protect the circuit, a clamping circuit using a FET 144 is used to limit the input of the amplifier 132 to a voltage level that produces an output voltage from the voltage controlled amplifier 14 which is only slightly greater than its nominal maximum output. The FET 144 is controlled by the output of a differential amplifier 145. The amplifier output is connected to the gate of FET 144 by a rectifier 146. The control signal which is to be limited, on line 95, is connected via a resistor 147 to the non-inverting input of amplifier 145. The inverting input of amplifier 145 is connected via resistor 148 to a voltage divider 149 which is connected between a negative voltage source and ground. The variable tap of voltage divider 149 provides the adjustment for setting the desired clamp level for the control signal on line 95.

Normally, the control signal varies from zero to a few volts negative with respect to ground. The signal is prevented from ever going positive by a diode 150 connected between the output and input of amplifier 132. Voltage divider 149 is set to provide on its tap a negative clamp level voltage which is slightly greater than the normal maximum value of the control signal. So long as the control signal voltage on line 95 is less than the clamp level voltage set on tap 149, the inverting input signal to amplifier 145 predominates, and due to the high gain of this amplifier it is driven to saturation, providing at its output a large positive voltage which is transmitted to the gate of FET 144 via rectifier 146. This voltage keeps FET 144 turned off, so that amplifier 132 exhibits its normal gain.

If, however, the magnitude of the voltage on line 95 should exceed the clamp level voltage at the tap of voltage divider 149, the non-inverting input signal to the amplifier 145 would predominate, so that the amplifier would switch over to provide a negative output at saturation level. This would result in a negative voltage on the gate of FET 144 which gate is connected via a resistor 151 to the source electrode of the FET. Under this condition the diode 146 provides protection for the FET against any deleterious effect which might otherwise be caused by the high negative voltage at the output of amplifier 145, but at the same time the leakage current through the diode causes sufficient negative bias to be maintained on the gate of the FET to insure that it is fully turned on. With the resulting low resistance path through FET 144 connecting the output of amplifier 132 to the input thereof, its gain would be sharply reduced, thus lowering the control voltage on line 95 below the clamp level, causing the differential amplifier to switch over and provide a positive output voltage, as before. The actual result of this negative feedback action is that in normal operation essentially the control voltage is not in fact permitted to rise above the clamp level, but is fixed thereat any time the input signal to amplifier 132 exceeds the value which would ordinarily cause its output to exceed the clamp level. A capacitor 152 connects the output of the amplifier 145 to its inverting input to provide a desired time constant for the amplifier response and thereby to stabilize the circuit.

To assure continued proper calibration of the system, means are provided for making the system produce a predetermined third logarithmic signal under certain standard conditions. More particularly, the standardizing potentiometer 19 is adjusted to produce a predetermined signal on lead 73 when the capacitance probe 28 is empty and the balancing capacitor 48 is out of the circuit. To perform a standardizing operation, the capacitance probe 28 is removed from the sheet 34 and a switch 154 in the balancing circuit is opened. The signal on lead 73 is applied by a lead 156 to a standardizing circuit 158 which compares the signal to a standard signal applied to the standardizing circuit 158 over a lead 160 from a potentiometer 162 set to produce the standard signal when energized from a negative power supply. The potentiometer 19 is then adjusted until the signal on lead 73 is of the proper standard magnitude, whereupon the system may be returned to its operating condition. Desirably, the standardizing is performed automatically, in which case the switch 154 may be relay operated, and the adjustment of the potentiometer 19 may be by a conventional servo system.

As noted above, the balancing capacitor 48 provides a balancing signal to balance out the effect of the capacitance of the empty probe. The balancing capacitor 48 is adjusted for this balanced condition by use of a balancing circuit 164 connected to the output circuit of the demodulator 50 by a lead 166. Balancing circuit 164 may be similar to the type disclosed in Canadian Pat. No. 812,370 issued May 6, 1969. The capacitance probe 28 is removed from the sheet 34, and the capacitor 48 is adjusted to the point where the balancing circuit 164 indicates null. Desirably, this balancing is also automatic.

Further check of the system is provided by a standard signal from a potentiometer 168 connected between positive and negative sources of potential. A standard signal is developed on a lead 170 by adjustment of the potentiometer. This standard signal is applied to the input resistor 70 of the grade offset section 65 by changing the position of the switch 74. The recorded signal is then observed and appropriate adjustments made. Switch 74 is then returned to the operating position.

It should further be noted that the logarithmic converters 54 and 62 include conventional means for adjusting their zero points and the slopes of their characteristic curves so that the first and second logarithmic signal outputs may be directly combined to provide the third logarithmic signal linearly related to the moisture content of the sheet 34.

Various modifications may be made in the circuit within the scope of the present invention. However, the system herein described in detail has been constructed and found to be accurate to within 0.1 percent equivalent moisture in measuring the relative moisture content of heavy paper in the range of 69 to 450 pound basis weight (per ream of 3000 square feet).

What is claimed is:

1. Apparatus for the quantitative determination of a property of a dielectric material, said apparatus comprising a source of alternating current electrical signal at a constant frequency, said source including control means responsive to a control signal for controlling the magnitude of said signal from said source, detecting means, capacitive probe means coupled to said source and having spaced electrodes arranged for applying said electrical signal from said source to at least a portion of said material and coupling said detecting means to said portion, said detecting means including means for deriving a detection signal resulting from the signal as applied to said portion from said source, as this applied signal is influenced by said material, balancing circuit means connected in circuit with said probe means to balance out from said detection signal any component developed by said probe means in the absence of said material, a first logarithmic converter coupled to said detecting means and responsive to said detection signal by producing a first logarithmic signal logarithmically related to said detection signal, means for applying said first logarithmic signal to said control means as a control signal to change the magnitude of said signal from said source oppositely from any change in the magnitude of said detection signal, a second logarithmic converter coupled to said source and responsive to said signal from said source by producing a second logarithmic signal logarithmically related to said signal from said source, and means for combining said first and second logarithmic signal to produce a third logarithmic signal logarithmically related to the ratio of said detection signal and said signal from said source and hence indicative of said property.

2. Apparatus according to claim 1, wherein said control means changes the magnitude of said signal from said source by substantially the same factor as the change in magnitude of said detection signal.

3. Apparatus according to claim 1, wherein the characteristic of said control means makes the range of said signal from said source substantially equal to the range of said detection signal over the range of measurement.

4. Apparatus according to claim 1, including means for adjusting the calibration of the system to offset the effect of changes in the mass of the material being measured.

5. Apparatus according to claim 1, including means for combining a calibrating signal with said third logarithmic signal to offset the effect on the measurement of the mass of the material being measured.

6. Apparatus according to claim 1, wherein said control means includes a source of reference signal and means for combining said reference signal and said control signal to produce a modified control signal, and said source includes a voltage controlled amplifier controlled by said modified control signal.

7. Apparatus according to claim 6, wherein said source of reference signal is adjustable and said means for combining said reference signal and said control signal comprises a summing amplifier having a variable input resistor to which said control signal is applied.

8. Apparatus according to claim 7, including clamping means for clamping the output of said summing amplifier to a predetermined voltage level whenever it would otherwise exceed that level.

9. A method for the quantitative determination of a property of a dielectric material, said method comprising applying a constant frequency alternating current electrical signal of controlled magnitude to a pair of spaced electrodes of a capacitive probe, deriving a detection signal resulting from the applied signal as this applied signal is influenced by said material while at the same time balancing out from said output signal any effect of the capacitance between said electrodes in the absence of said material, deriving from said detection signal a first logarithmic signal logarithmically related thereto, utilizing said first logarithmic signal to control the magnitude of said applied signal by changing said magnitude oppositely from any change in the magnitude of said detection signal, deriving from said applied signal a second logarithmic signal logarithmically related thereto, and combining said first and second logarithmic signals to produce a third logarithmic signal logarithmically related to the ratio of said detection signal and said applied signal and hence indicative of said property.

10. The method according to claim 9, wherein the magnitude of said applied signal is changed by substantially the same factor as the magnitude of said detection signal.

11. The method according to claim 9, wherein the magnitude of the applied signal is controlled to vary over a range substantially equal to the range of the detection signal over the range of measurement.

12. The method according to claim 9, wherein a reference signal is added to said first logarithmic signal to form a modified control signal for controlling the magnitude of said applied signal.

13. The method according to claim 9 wherein a compensating signal is combined with said third logarithmic signal to offset the effect on the measurement of the mass of the material being measured.

* * * * *